(12) United States Patent
Griffin et al.

(10) Patent No.: US 6,497,098 B2
(45) Date of Patent: Dec. 24, 2002

(54) METHOD AND DEVICE FOR GENERATING HOT COMBUSTION WASTE GASES

(75) Inventors: Timothy A. Griffin, Ennetbaden (CH); Dieter Winkler, Lauchringen (DE); Richard Carroni, Niederrohrdorf (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/975,325

(22) Filed: Oct. 12, 2001

(65) Prior Publication Data

US 2002/0088221 A1 Jul. 11, 2002

Related U.S. Application Data

(60) Provisional application No. 60/239,886, filed on Oct. 13, 2000.

(30) Foreign Application Priority Data

Mar. 21, 2001 (CH) .............................................. 0513/01

(51) Int. Cl.[7] .............................................. F01K 25/06
(52) U.S. Cl. ...................... 60/649; 60/39.02; 60/39.182
(58) Field of Search ........................ 60/649, 651, 39.02, 60/39.181, 39.182

(56) References Cited

U.S. PATENT DOCUMENTS

| | | | | |
|---|---|---|---|---|
| 4,341,069 A | * | 7/1982 | Bell et al. | .................... 518/703 |
| 4,434,613 A | * | 3/1984 | Stahl | ..................... 60/39.182 |
| 5,976,223 A | | 11/1999 | Prasad et al. | |
| 6,298,084 B1 | * | 10/2001 | Vinggaard et al. | .......... 375/224 |
| 6,298,664 B1 | * | 10/2001 | Ang et al. | ..................... 60/649 |

FOREIGN PATENT DOCUMENTS

| | | |
|---|---|---|
| EP | 0 882 486 | 12/1998 |
| WO | 98/55208 | 12/1998 |
| WO | 98/55393 | 12/1998 |
| WO | 98/55394 | 12/1998 |

* cited by examiner

*Primary Examiner*—Hoang Nguyen
(74) *Attorney, Agent, or Firm*—Burns, Doane, Swecker & Mathis, L.L.P.

(57) ABSTRACT

The invention relates to a process for producing hot combustion waste gases (11), in particular for a gas turbine system. In a burner (2), a combustion that produces hot combustion waste gases (11) takes place. A portion (17) of the combustion waste gases (11) is branched off and fed to a first inlet (16) of an oxygen separation device (5). An oxygen-containing gas (20) is fed to a second inlet (23) of the oxygen separation device (5). The oxygen separation device (5) is provided with oxygen separation means (6) that remove oxygen from the oxygen-containing gas (20) and feed it to the branched-off waste gas (17), producing oxygen-containing gas (34) whose oxygen content has been reduced as well as oxygen-enriched, branched-off waste gas (25). The oxygen-enriched, branched-off waste gas (25) as well as a fuel (31) or a fuel/steam mixture are fed to the burner (2) and form a combustion mixture that burns in the burner (2) while forming the hot combustion waste gases (11).

In order to improve the efficiency of such a method, the burner (2) contains a catalyzer that initiates and/or stabilizes the combustion.

21 Claims, 3 Drawing Sheets

METHOD AND DEVICE FOR GENERATING HOT COMBUSTION WASTE GASES

This application claims the benefit of provisional application No. 60/239,886, filed Oct. 13, 2000.

BACKGROUND

1. Field of the Invention

The invention relates to a method and to a device for generating hot combustion waste gases, in particular to a gas turbine system having an oxygen separation device that receives a portion of combustion waste gas and feeds oxygen from an oxygen-containing gas to the waste gas which is then fed with a fuel or fuel/steam mixture to a burner for catalytically initiated or stabilized combustion.

2. Background of the Invention

EP 0 882 486 A1 discloses a device of the above-mentioned type provided with a burner whose outlet side is connected to a waste gas line, from which a return line branches off. In this burner, a combustion that generates hot combustion waste gases takes place. These combustion waste gases exit the burner through the waste gas line, whereby one part of the combustion waste gases is branched off via the return line. The device is provided with an oxygen separation device, the first inlet of which is connected to the return line, and the second inlet of which is connected to a gas supply that provides oxygen-containing gas. The oxygen separation device therefore is supplied with branched-off or returned waste gas via its first inlet, and with oxygen-containing gas, for example concentrated ambient air, via its second inlet. The oxygen separation device contains oxygen separation means, for example an ion transport membrane. These oxygen separation means remove oxygen from the oxygen-containing gas and supply it with the branched off waste gas, so that the oxygen content of the oxygen-containing gas is reduced, and oxygen-enriched, branched-off waste gas is generated. The oxygen separation device is provided with a first outlet for the oxygen-enriched, branched-off waste gas as well as a second outlet for the gas that has been reduced with respect to its oxygen content. An inlet side of the burner is connected to the first outlet of the oxygen separation device as well as to a fuel supply that supplies fuel. In this manner, a combustion mixture that burns in the burner while forming the desired hot combustion waste gases is created no later than in the burner. The combustion gases generated in this manner can be used, in particular, in a gas turbine system in order to generate electrical energy.

By using such a device or method, it is possible to reduce noxious emissions during energy generation, in particular to significantly reduce $CO_2$ emissions during the combustion of fossil fuels.

The core concept of these methods and devices is that pure oxygen is used as an oxidant for the combustion, since this greatly simplifies the waste gas after treatment. The reason for this is that a combustion process with molecular oxygen provides a waste gas that essentially consists only of $CO_2$ and $H_2O$. Since oxygen, which is produced in refrigerated plants, is very expensive, new technologies have been developed for oxygen production. Important factors hereby are oxygen separation devices that are provided with a membrane that is conductive for oxygen ions and electrons, a so-called MCM membrane (mixed conducting membrane). Such an MCM membrane has a retention side on which the oxygen-containing gas is located and a pass-through side on which the gas to be enriched is located. The MCM membrane transports oxygen ions from the retention side to the pass-through side and causes an electron transport from the pass-through side to the retention side. For this purpose, oxygen is removed from the gas on the retention side and is supplied to the gas on the pass-through side. In order to increase the conductivity of such a MCM membrane, it is advantageous to set a relatively high flow speed on the pass-through side in order to keep the oxygen concentration on the pass-through side as low as possible. A high flow speed on the pass-through side results only in a relatively small enrichment of the returned waste gases with oxygen, however, so that this oxygen/waste gas mixture shows only weak reactance and is not suitable for standard combustion methods.

U.S. Pat. No. 5,976,223 discloses a method and a device for producing carbon dioxide and oxygen. Into a first oxygen separation device working with a MCM membrane, compressed, heated, and oxygen-containing gas is introduced on the retention side. On the pass-through side, a gaseous fuel is supplied that reacts with the added oxygen and forms carbon dioxide. The oxygen-containing gas whose oxygen-content has been reduced is heated by the exothermic reaction taking place hereby. The oxygen-containing gas heated in this manner is then fed to a second oxygen separation device working with an MCM membrane on its retention side. The desired oxygen then collects on the pass-through side of this second oxygen separation device.

WO 98/55394 describes a method in which an oxygen separation device working with an MCM membrane is used as a burner in order to produce hot combustion waste gases for a gas turbine system. Hereby ambient air is compressed, heated, and fed to the retention side of this membrane reactor. A mixture of returned waste gas and fuel is fed to the retention side. Then oxygen is removed from the fed-in air in the membrane reactor and is fed into the mixture. On the pass-through side, the fuel then reacts with the oxygen on the membrane surface that is coated with an oxidation catalyzer. The resulting hot waste gases are then fed to a turbine.

WO 98/55208 discloses a further method for the production of hot combustion gases for the operation of a turbine, in which compressed fresh air is heated in a first burner and is fed to the retention side of a oxygen separation device working with an MCM membrane. Returned waste gas is fed together with fuel to a second burner that may be constructed as a catalyzer. The combustion gases generated there are then fed to the pass-through side of the oxygen separation device, where they are enriched with oxygen. The waste gases enriched with oxygen are then fed to a third burner and burned there with fuel in order to generate hot combustion gases that drive a turbine.

SUMMARY OF THE INVENTION

The invention at hand concerns the objective of disclosing for a method or device of the initially mentioned type an embodiment that has a higher efficiency.

According to the invention, this objective can be realized by a method for producing hot combustion waste gas, comprising the steps of producing a hot combustion waste gas by combustion in a burner that is catalytically initiated or stabilized, feeding a first portion of the combustion waste gas to a first inlet of a first oxygen separation device, feeding an oxygen-containing gas to a second inlet of the first oxygen separation device, removing oxygen from the oxygen-containing gas by an oxygen separation means of the first oxygen separation device and reducing an oxygen content of the oxygen-containing gas, feeding said oxygen to the first portion of the combustion waste gas and oxygen enriching an oxygen content of the first portion of the combustion waste gas, and feeding the oxygen-enriched, first portion of the combustion waste gas and a fuel or a fuel/steam mixture to the burner to form a combustion mixture that burns in the burner in the step of producing the hot combustion waste gas. This procedure allows the combustion mixture to react adequately even in the presence of relatively low oxygen concentrations in order to produce the desired hot combustion waste gases.

Since this means that a relatively low oxygen content in the combustion mixture will be sufficient, the flow speed of the returned waste gases can be increased on the pass-through side of an oxygen separation device working with an MCM membrane, increasing its efficiency and thus the efficiency of the entire process.

The objective underlying this invention is also realized with a device for producing a hot combustion waste gas, comprising a burner comprising an outlet side, an inlet side, and a catalyzer that initiates or stabilizes a combustion and a first oxygen separation device comprising a first inlet, a second inlet, a first oxygen separation means that removes oxygen from an oxygen-containing gas and feeds the oxygen to a branched-off waste gas, a first outlet for the oxygen-enriched, branched-off waste gas, and a second outlet for the reduced oxygen-containing gas. The outlet side of the burner is connected to a waste gas line from which a return line branches off, the inlet side of the burner operatively communicates with the first outlet of the first oxygen separation device and a fuel supply line to supply a fuel or a fuel/steam mixture, the first inlet of the first oxygen separation device is operatively connected with the return line, and the second inlet of the first oxygen separation device is operatively connected to a gas supply line to supply the oxygen-containing gas. The divide also creates the possibility of burning combustion waste gases with a relatively low oxygen content in order to generate the desired hot combustion waste gases. As explained above, this makes it possible to increase the efficiency during the production of the hot combustion waste gases. With an integration of the device according to the invention or the method according to the invention into a gas turbine system, the latter's efficiency also can be increased.

In a further development, a second oxygen separation device may be provided, whereby the non-branched-off or non-returned part of the hot combustion waste gases as well as fuel or fuel/steam mixture are fed to a first inlet of this second oxygen separation device and hereby form a mixture, and whereby the oxygen-containing gas that has been reduced with respect to its oxygen content is fed to a second inlet of this second oxygen separation device, whereby this second oxygen separation device also is provided with oxygen separation means, for example an MCM membrane, that is able to remove yet even more oxygen from the oxygen-containing gas and feed it into the mixture, whereby the mixture on the one hand burns with the oxygen and produces hot combustion waste gases, while on the other hand a gas that has again been reduced with respect to its oxygen content and heated, i.e. oxygen-poor gas, is produced. These measures make it possible to provide both hot combustion waste gas as well as hot, oxygen-poor gas, which can be used, for example, in a following gas turbine system for the production of electricity. Because of the higher starting temperatures that can be achieved, this results overall in a higher efficiency for the overall system.

In a preferred further development, the catalyzer of the burner can be designed as a metal oxide catalyzer. Suitable metals belong, for example, to the perovskite family, e.g. $La_{1-x}Sr_xBO_3$, whereby the B side contains elements of the transition metals, for example Mn, Fe, Co. Simple metal oxides from Mn or Ce also can be used. Metal oxide catalyzers are characterized by their high heat resistance, but in contrast to noble metal catalyzers require higher inlet temperatures, which in the present case do exist, however.

Catalyzers with a monolithic carrier and parallel flow channels were found to be advantageous. Such catalyzers are characterized by their relatively low flow resistance. Catalyzers of this type are used, for example, in waste gas cleaning systems of vehicles, in so-called "3-wax catalyzers."

In an especially advantageous embodiment, the burner may be connected in a heat-transferring manner with a heat exchanger that heats the oxygen-containing gas prior to its entrance into the oxygen separation device. The heat exchanger, for example, forms the outer sleeve of the burner, achieving an especially high efficiency for the heat exchanger.

Preferred is a first embodiment in which the oxygen separation device has a first chamber and a second chamber, and in which the oxygen separation means are provided with a membrane, for example an MCM membrane, that separates the two chambers from each other and transports oxygen from one chamber into the other chamber. Particularly advantageous hereby is an embodiment in which the flow passes through both chambers in the same direction and parallel to the membrane. This flow in the same direction makes it possible to create a relatively low temperature profile in the membrane, both parallel to the flow and vertical to it. As a result, thermal loads are reduced.

A gas turbine system comprises the device for producing a hot combustion waste gas and a first gas turbine for generating electricity, the first gas turbine in operative communication with the device to receive the hot combustion waste gas. A second gas turbine can also be in operative communication with the device. The second gas turbine can be connected to a compressor to compress the oxygen-containing gas prior to entry into the device and can be connected to a generator for electrical generation.

BRIEF DESCRIPTION OF THE DRAWINGS

Preferred embodiments of the invention are disclosed in the following description and illustrated in the accompanying drawings, in which.

DETAILED DESCRIPTION OF THE INVENTION

Figure 1:
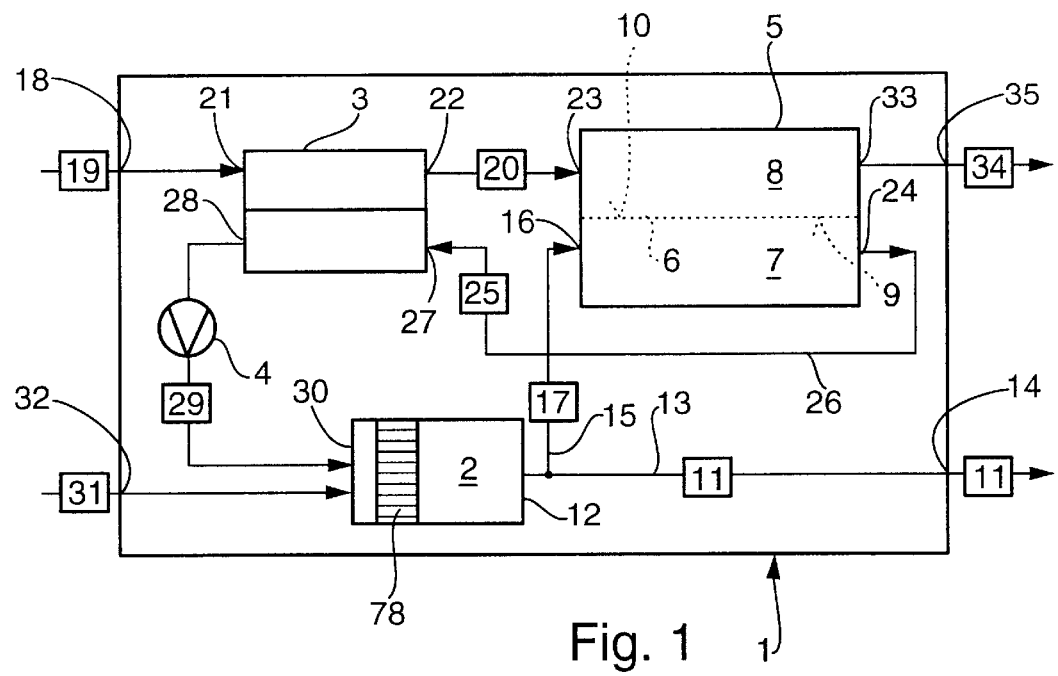
FIG. 1 is a block diagram-like principle view of a device according to the invention for a first embodiment.

According to FIG. 1, a device 1, here symbolized by a box, is provided with a burner 2, a heat exchanger 3, a compressor 4, and an oxygen separation device 5. This oxygen separation device 5 has, as an oxygen separation means, an MCM membrane 6, symbolized here by a dotted line. This MCM membrane 6 divides in the oxygen separation device 5 a first chamber 7 from a second chamber 8, whereby in the first chamber 7 a pass-through side 9, and in the second chamber 8 a retention side 10 is exposed to the membrane 6. In the burner 2, a combustion takes place that produces hot combustion gases 11 that enter on an outlet side 12 of the burner 2 into a waste gas line 13 connected to it. At 14, the desired hot combustion gases 11 are passed out of the device 1.

From the waste gas line 13, a return line 15 branches off, which is connected to a first inlet 16 of the of the oxygen separation device 5. Through this first inlet 16, branched-off waste gas 17 is able to reach the first chamber 7, i.e. the pass-through side 9 of the membrane 6.

At 18, oxygen-containing gas 19, e.g. air, enters the device 1 and is there fed to a first inlet 21 of the heat exchanger 3. In the heat exchanger 3, the oxygen-containing gas 19 is heated so that heated, oxygen-containing gas 20 exits a first outlet 22 of the heat exchanger 3. The first outlet 22 of the heat exchanger 3 is connected to a second inlet 23 of the oxygen separation device 5, so that the heated, oxygen-containing gas 20 enters the second chamber 8, i.e. at the retention side 10 of the membrane 6. The MCM membrane 6 now brings about a transport of oxygen from the retention side 10 to the pass-through side 9. Hereby oxygen is removed from the added oxygen-containing gas 20, reducing its oxygen content. At the same time, oxygen is fed into the branched-off waste gas 17, enriching it with oxygen. At a first outlet 24 of the oxygen separation device 5, waste gas 25 accordingly enriched with oxygen exits the first chamber 7 and is fed via a line 26 to a second inlet 27 of the heat exchanger 3. In the heat exchanger 3, the oxygen-enriched, returned waste gas 25 is cooled. Then cooled, enriched waste gas 29 that is also compressed in the compressor 4 exits from a second outlet 28 of the heat exchanger 3. This compressed, enriched waste gas 29 is then fed to an inlet side 30 of the burner 2. The inlet side 30 of the burner 2 is also supplied with fuel or a fuel/steam mixture 31 that reaches the device 1 at 32. In the burner 2, a combustion mixture of the oxygen-enriched, returned waste gases 29 and the added fuel 31 then forms. According to the invention, the burner 2 includes a catalyzer 78 that initiates and/or stabilizes the combustion reaction. During this combustion, the desired hot combustion waste gases 11 are produced.

At a second outlet 33 of the oxygen separation device 5, oxygen-containing gas 34 that now has a reduced oxygen content, but an increased temperature exits. This oxygen-containing gas 34 exits the device 1 at 35. The oxygen separation device 5 here also functions as a heat exchanger, whereby it should be noted that the flow flows through the two chambers 7 and 8 in the same direction in order to keep temperature loads in the membrane 6 as small as possible.

Figure 2:
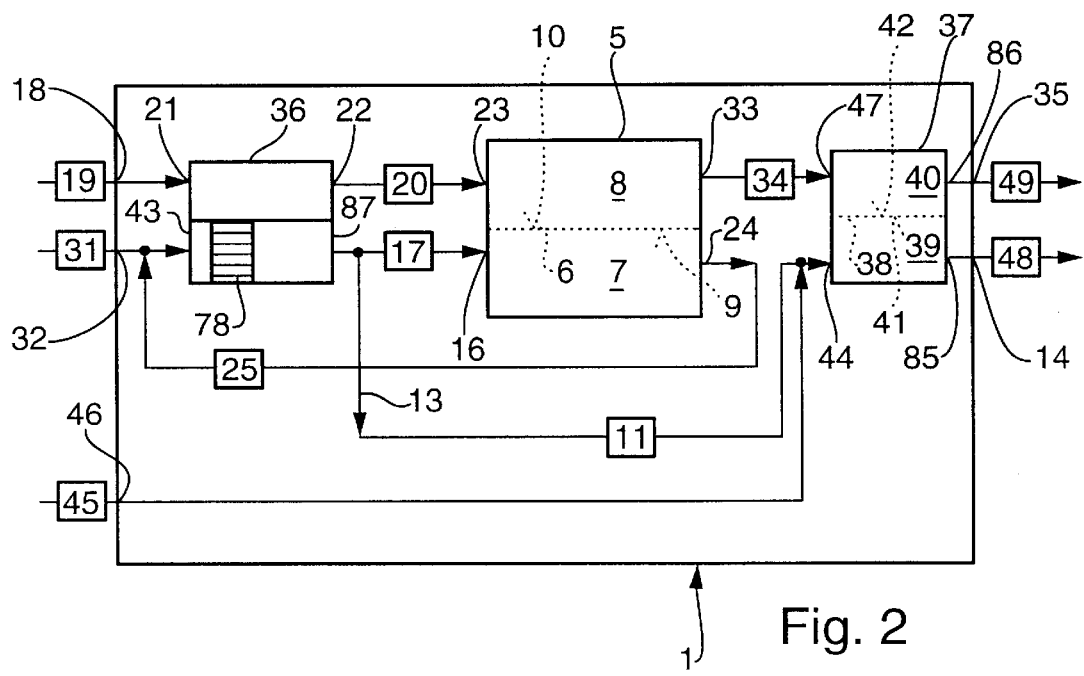
FIG. 2 is a view as in FIG. 1, but for a second embodiment.

In an exemplary embodiment, the burner 2 and the heat exchanger 3 can be combined to form a heat exchanger/burner unit. According to FIG. 2, a corresponding embodiment of the device 1 thus has such a heat exchanger/burner unit 36. The device 1 again has the oxygen separation device 5 that in this embodiment is called the first oxygen separation device 5. The device 1 also contains a second oxygen separation device 37 that also works with an MCM membrane 38 as oxygen separation mean. This membrane 38 divides a first chamber 39 from a second chamber 40 and has a pass-through side 41 exposed to the first chamber 39, and a retention side 42 exposed to the second chamber 40.

A combustion that produces hot combustion waste gases 11, which exit at an outlet side 87, also takes place in the heat exchanger/burner unit 36. A partial stream 17 of these combustion waste gases 11 is also branched off here and fed into the first oxygen separation device 5. The branched-off waste gases 17 therefore enter the first chamber 7 of the first oxygen separation device 5. The oxygen-enriched waste gas 25 produced there is then fed to an inlet side 43 of the heat exchanger/burner unit 36. In addition, the fuel or fuel/steam mixture 31 is fed to the inlet side 43 of the heat exchanger/burner unit 36.

The potion of the combustion waste gases 11 not branched off or returned is fed to a first inlet 44 of the second oxygen separation device 37, whereby fuel 45 is also fed to this first inlet 44, which fuel enters the device 1 at 46. This means that a mixture of combustion waste gases 11 and fuel 45 is fed into the first chamber 39, i.e. on the pass-through side 41.

The oxygen-containing gas 19 entering the device at 18 is greatly heated in the heat exchanger/burner unit 36 and is fed as the heated, oxygen-containing gas 20 to the first oxygen separation device 5. From the latter, the oxygen-containing gas 34 that has been reduced with respect to its oxygen content exits the second outlet 33 and enters through a second inlet 47 of the second oxygen separation device 37 in the latter's second chamber 40 and is then on the retention side 42. The membrane 38 brings about a transport of oxygen from the second chamber 40 into the first chamber 39, so that a combustible mixture forms in the first chamber 39. Because of the high temperatures, a combustion reaction occurs in the second oxygen separation device 37 or in its first chamber 39. The second oxygen separation device 37 accordingly works as a membrane reactor.

The combustion reaction again causes hot combustion waste gases 48 to form in the first chamber 39, said combustion waste gases exiting through a first outlet 85 of the second oxygen separation device 37 from the first chamber 39, and at 14 from the device 1. The operation of the second oxygen separation device 37 removes even more oxygen from the oxygen-containing gas 34, whereby this gas is at the same time greatly heated due to the reaction in the first chamber 39. The heated, now essentially oxygen-poor gas 49 exits the second chamber 40 through a second outlet 86, and from the device 1 at 35. The flow through the chambers 39 and 40 of the second oxygen separation device 37 in parallel or in the same direction also should be noted here. The selected flow makes it possible to avoid temperature peaks, increasing the useful life of the membrane 38.

Figure 3:
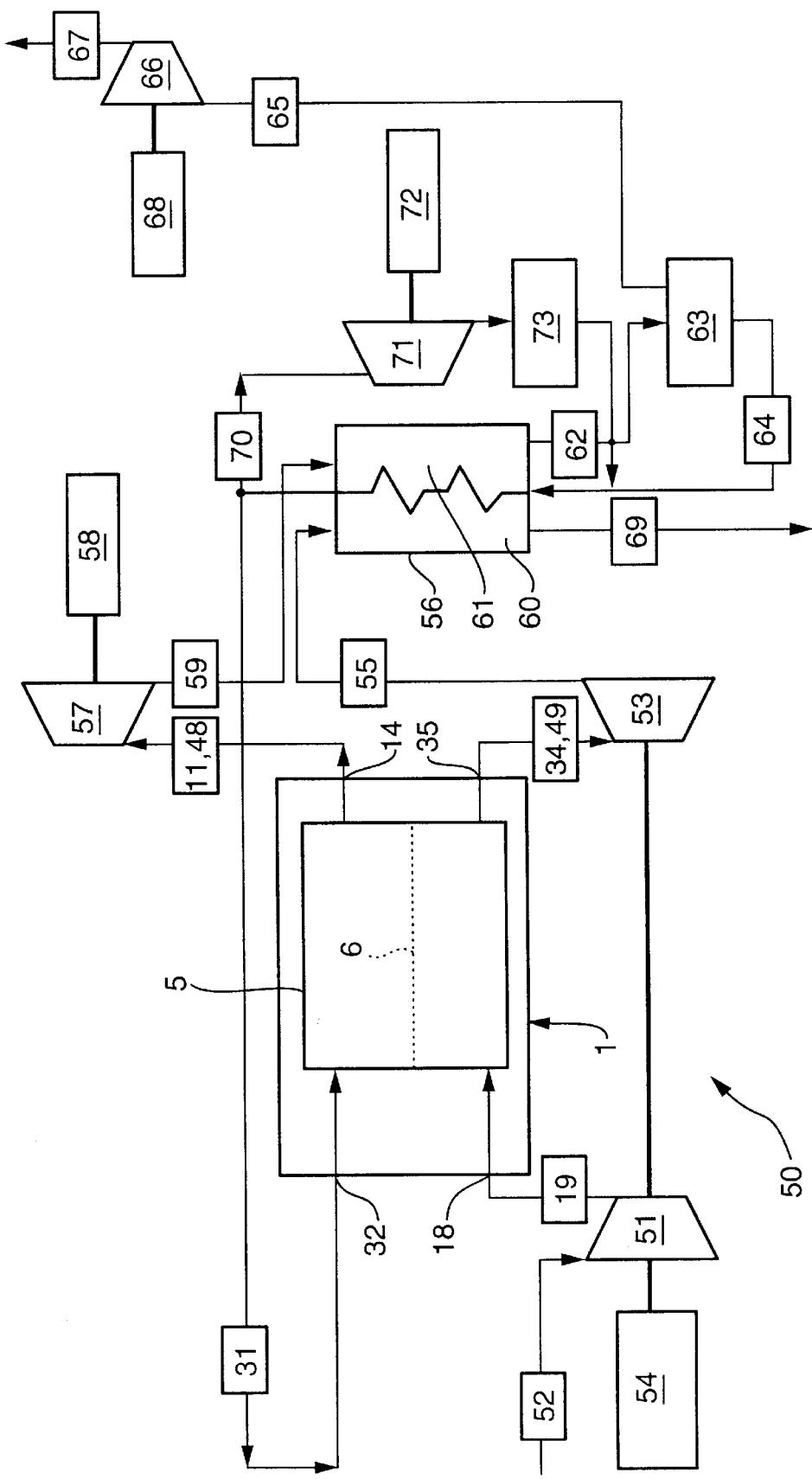
FIG. 3 is a block diagram-like principle view of a gas turbine system containing a device according to the invention.

According to FIG. 3, the device 1 according to the invention may be integrated into a gas turbine system 50 that is used to generate electricity. Of the complex construction of the device 1 according to the invention, only the oxygen separation device 5 with the membrane 6 is shown in an exemplary member in FIG. 3. In principle, both the embodiment according to FIG. 1 as well as the embodiment according to FIG. 2 as well as any other desired variation of the device 1 can be implemented in the gas turbine system 50.

A compressor 51 compresses the ambient air 52. The heated and compressed ambient air forms the oxygen-containing gas 19 that is fed into device 1 at 18. In this device 1, the ambient air is heated, and its oxygen content is reduced. The heated, oxygen-poor air 34 (variation according to FIG. 2) or 49 (variation according to FIG. 2) exits the device 1 at 35 and is fed to a turbine 53 that is connected to a compressor 51 and a generator 54 for electricity generation. The gas 34 or 49 fed to the turbine 53 is expanded in the turbine 53 and forms an expanded flow 55, the heat of which is recovered in a steam generator 56. Then cooled, oxygen-poor gas 69 that can undergo further treatment exits the steam generator 56.

At 32, fuel or a fuel/steam mixture 31 is fed to the device 1, whereby the fuel inside the device 1—as described above—burns with the oxygen from the oxygen-containing gas 19. The resulting combustion essentially produces only $CO_2$ and $H_2O$ and forms the desired hot combustion waste gases 11 (variation according to FIG. 1) or 48 (variation according to FIG. 2) that exit the device 1 at 14. The hot combustion waste gases 11, 48 are expanded in a turbine 57 that drives another generator 58 for electricity generation. In the process, expanded combustion waste gases 59 that are also fed to the steam generator 56 form. The steam generator 56 hereby comprises separate chambers 60 and 61 for the expanded, oxygen-poor gases 55 or for the expanded combustion waste gases 59. Then cooled combustion waste gas 62 exits the steam generator 56 and can be fed to a cooler 63 in which the water steam contained in the waste gas 62 is condensed. The resulting water 64 is again fed to the steam generator 56. The remaining $CO_2$ 65 leaves the cooler 63 and can be compressed and, as the case may be, liquefied, in a compressor 66. The compressed and/or liquefied $CO_2$ 67 then can be processed further. The compressor 66 is, for example, driven by a motor 68. A coupling with the turbine 57 is also conceivable.

The steam 70 generated by the steam generator 56 can be expanded in a turbine 71 that drives another generator 72 for electricity generation. The expanded steam then can be condensed in a condenser 73 into water and returned to the steam generator 56. It would also be possible to use the steam 70 as process steam for other purposes; for example, the steam 70 can be mixed with the fuel 31 to form a fuel/steam mixture.

Figure 4:
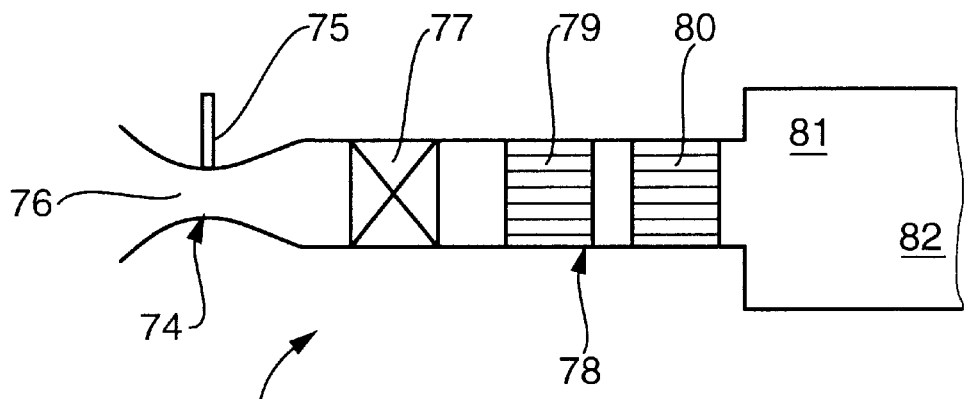
FIG. 4 is a longitudinal section of a principle view through a burner constructed according to the invention in a first embodiment.
Figure 5:
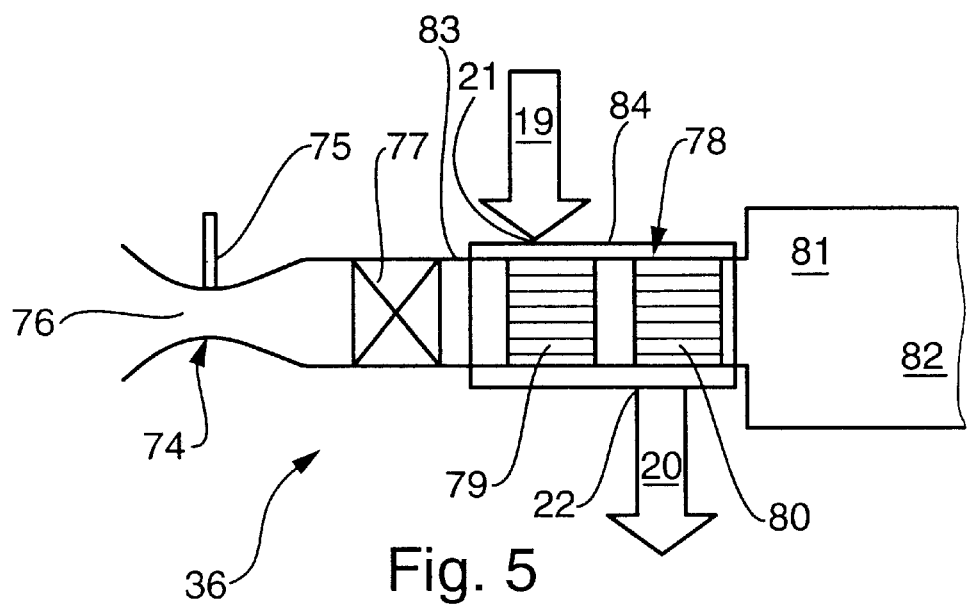
FIG. 5 is a view as in FIG. 4, but for a second embodiment.

According to FIGS. 4 and 5, the burner 2 (FIG. 4) or, respectively, the heat exchanger/burner unit 36 (FIG. 5) has a fuel oxidator/mixer 74 formed, for example, by an injection nozzle 75 and a Venturi mixing section 76. Alternatively or additionally, a static mixer 77 may be provided. Also provided is a catalyzer 78 that may comprise one or more catalyzer elements. In the example at hand, the catalyzer 78 consists of catalyzer elements 79 and 80 arranged serially. Each of these catalyzer elements 79, 80 is preferably constructed as a monolithic carrier with parallel flow channels and preferably consists of metal oxide. Because of the parallel flow channels, the catalyzer elements 79, 80 and thus the entire catalyzer 78 only have a low flow resistance, so that only a relatively low pressure loss occurs during the flow through the catalyzer 78.

It is useful that the catalyzer element 79 located upstream with respect to the flow through the burner 2 or the heat exchanger/burner unit 36 consists of a catalyzer material that is more active than that of the catalyzer element 80 located downstream. It is also useful that the downstream catalyzer element 80 is produced from a thermally more stable material than the upstream catalyzer element 79. While the upstream catalyzer element 79 therefore is particularly suitable for an initiation of the combustion, the downstream catalyzer element 80 can be used particularly well for stabilizing the combustion. If there are more than two catalyzer elements 79, 80, one or more upstream catalyzer elements 79 accordingly may be more active and/or one or more downstream catalyzer elements 80 may be more stable.

The catalyzer 78 is followed by a stabilization zone 81 that brings about an aerodynamic stabilization of the homogeneous reaction zone. Downstream from this stabilization zone 81 is a burn-out zone 82, in which the homogeneous reaction can be completed.

According to FIG. 5, a housing 83 in which the actual burner of the heat exchanger/burner unit 36 is constructed is enclosed at least in the area of the catalyzer 78 by a heat exchanger 84 into which relatively cold, oxygen-containing gas 19 enters at 21, and from which relatively warm, oxygen-containing gas 20 exits at 22. This results in a particularly compact construction for the heat exchanger/burner unit 36.

What is claimed is:

1. A method for producing hot combustion waste gas, comprising the steps of:

producing a hot combustion waste gas by combustion in a burner, wherein the combustion in the burner is one or more of catalytically initiated and catalytically stabilized;

feeding a first portion of the combustion waste gas to a first inlet of a first oxygen separation device;

feeding an oxygen-containing gas to a second inlet of the first oxygen separation device;

removing oxygen from the oxygen-containing gas by an oxygen separation means of the first oxygen separation device, wherein the step of removing oxygen reduces an oxygen content of the oxygen-containing gas;

feeding said oxygen to the first portion of the combustion waste gas, wherein the step of feeding said oxygen enriches an oxygen content of the first portion of the combustion waste gas; and, feeding the oxygen-enriched, first portion of the combustion waste gas and a fuel or a fuel/steam mixture to the burner to form a combustion mixture that burns in the burner in the step of producing the hot combustion waste gas.

2. The method as claimed in claim 1, wherein the oxygen-containing gas is heated prior to the step of feeding into the second inlet of the oxygen separation device.

3. The method as claimed in claim 1, further comprising the steps of:

feeding a second portion of the hot combustion waste gas and the fuel or the fuel/steam mixture to a first inlet of a second oxygen separation device;

forming a mixture of the hot combustion waste gas and the fuel or the fuel/steam mixture; and feeding the reduced oxygen-containing gas to a second inlet of the second oxygen separation device, the second oxygen separation device having an oxygen separation means that further removes oxygen from the reduced oxygen-containing gas and feeds it into the mixture, wherein the mixture burns and produces a second hot combustion waste gas and the further reduced oxygen-containing gas is heated.

4. A device for producing a hot combustion waste gas, comprising:

a burner comprising an outlet side, an inlet side, and a catalyzer that initiates or stabilizes a combustion; and a first oxygen separation device comprising a first inlet, a second inlet, a first oxygen separation means that removes oxygen from an oxygen-containing gas and feeds the oxygen to a branched-off waste gas, a first outlet for the oxygen-enriched, branched-off waste gas, and a second outlet for the reduced oxygen-containing gas, wherein the outlet side of the burner is connected to a waste gas line from which a return line branches off, the inlet side of the burner operatively communicates with the first outlet of the first oxygen separation device and a fuel supply line to supply a fuel or a fuel/steam mixture, the first inlet of the first oxygen separation device is operatively connected with the return line, and the second inlet of the first oxygen separation device is operatively connected to a gas supply line to supply the oxygen-containing gas.

5. The device as claimed in claim 4, further comprising:
a second oxygen separation device comprising a first inlet operatively communicating with the waste gas line from the outlet side of the burner and the fuel supply line to supply a fuel or a fuel/steam mixture, a second inlet operatively communicating with the second outlet of the first oxygen separation device, a second oxygen separation means that removes further oxygen from the reduced oxygen-containing gas and feeds said oxygen to a mixture of the fuel or the fuel/steam mixture and a combustion waste gas, a first outlet, and a second outlet,
wherein the mixture burns and produces a hot combustion waste gas and the further reduced oxygen-containing gas is heated, the hot combustion waste gas exiting the second oxygen separation device by the first outlet and the hot, further reduced oxygen-containing gas exiting the second oxygen separation device by the second outlet.

6. The device as claimed in claim 4, wherein the catalyzer is constructed as a metal oxide catalyzer.

7. The device as claimed in claim 4, wherein the catalyzer is provided with a monolithic carrier with parallel flow channels.

8. The device as claimed in claim 4, wherein the burner is connected in a heat-transferring manner with a heat exchanger that heats the oxygen-containing gas prior to its entry into the first oxygen separation device.

9. The device as claimed in claim 4, wherein at least one of the oxygen separation devices has a first chamber, a second chamber, and a membrane that divides the first and second chambers from each other and transports oxygen from one chamber into the other chamber, both chambers passed by a flow in the same direction and parallel to the membrane.

10. The device as claimed in claim 4, wherein the burner is provided with a burn-out zone downstream from the catalyzer.

11. The device as claimed in claim 10, wherein the burner is provided between the catalyzer and the burn-out zone with a stabilization zone.

12. The device as claimed in claim 4, wherein the catalyzer is provided with at least two catalyzer elements arranged serially.

13. The device as claimed in claim 12, wherein at least one upstream catalyzer element consists of a more active catalyzer material than at least one downstream catalyzer element.

14. The device as claimed in claim 12, wherein at least one downstream catalyzer element consists of a thermally more stable catalyzer material than at least one upstream catalyzer element.

15. The method as claimed in claim 1, further comprising the steps of:
feeding a second portion of the hot combustion waste gas to a gas turbine to produce electricity.

16. The method as claimed in claim 1, further comprising the steps of:
feeding the reduced oxygen-containing gas to a gas turbine to produce electricity.

17. The method as claimed in claim 3, further comprising the steps of:
feeding at least a portion of a second hot combustion waste gas to a gas turbine to produce electricity.

18. The method as claimed in claim 3, further comprising the steps of:
feeding the further reduced oxygen-containing gas to a gas turbine to produce electricity.

19. A gas turbine system, comprising:
a device for producing a hot combustion waste gas, the device comprising a burner comprising an outlet side, an inlet side, and a catalyzer that initiates or stabilizes a combustion and a first oxygen separation device comprising a first inlet, a second inlet, a first oxygen separation means that removes oxygen from an oxygen-containing gas and feeds the oxygen to a branched-off waste gas, a first outlet for the oxygen-enriched, branched-off waste gas, and a second outlet for the reduced oxygen-containing gas, wherein the outlet side of the burner is connected to a waste gas line from which a return line branches off, the inlet side of the burner operatively communicates with the first outlet of the first oxygen separation device and a fuel supply line to supply a fuel or a fuel/steam mixture, the first inlet of the first oxygen separation device is operatively connected with the return line, and the second inlet of the first oxygen separation device is operatively connected to a gas supply line to supply the oxygen-containing gas; and
a first gas turbine for generating electricity, the first gas turbine in operative communication with the device to receive the hot combustion waste gas.

20. The gas turbine system of claim 19, wherein the device further comprises a second oxygen separation device comprising a first inlet operatively communicating with the waste gas line from the outlet side of the burner and the fuel supply line to supply a fuel or a fuel/steam mixture, a second inlet operatively communicating with the second outlet of the first oxygen separation device, a second oxygen separation means that removes further oxygen from the reduced oxygen-containing gas and feeds said oxygen to a mixture of the fuel or the fuel/steam mixture and a combustion waste gas, a first outlet, and a second outlet,
wherein the mixture burns and produces a hot combustion waste gas, the hot combustion waste gas exiting the second oxygen separation device by the first outlet and wherein the further reduced oxygen-containing gas is heated and exits the second oxygen separation device by the second outlet.

21. The gas turbine system of claim 19, further comprising a second gas turbine in operative communication with the device at the second outlet, the second gas turbine operatively connected to a compressor to compress the oxygen-containing gas prior to entry into the device and to a generator for electrical generation.

* * * * *